Jan. 25, 1949.  E. H. BICKLEY  2,460,212

POSITIONING OBJECTS FOR AUTOMATIC COLOR SORTING

Filed June 25, 1946

INVENTOR
EVERETT H. BICKLEY
BY
Bair, Borden & Fox
ATTORNEYS

Patented Jan. 25, 1949

2,460,212

UNITED STATES PATENT OFFICE 2,460,212

POSITIONING OBJECTS FOR AUTOMATIC COLOR SORTING

Everett H. Bickley, Bala-Cynwyd, Pa.

Application June 25, 1946, Serial No. 679,186

3 Claims. (Cl. 198—33)

The present invention relates to machines for sorting objects for color, such as disclosed in applicant's pending application, Ser. No. 609,619, and more particularly to a novel mechanism for causing all objects of the same kind to pass a sorting point with the same surface of each object accurately positioned for observation by the color detecting instrumentality.

In the sorting of objects of irregular contour, namely those having a round surface as well as a flat surface, such as coffee beans and peanuts, it has been found that when the flat side of the object is viewed by the photo-electric cell, irregular reflections result in such a loss of sensitivity as to broaden the color selection beyond that required for commercial use.

Some of the objects of the present invention are: to provide a new and novel mechanism for bringing flat sided objects such as coffee and peanuts to a sorting point with the most effective area of each exposed to the color selecting device; to provide a mechanism for automatically turning beans having a flat side and a convex side so that the latter side of each is presented at the sorting point; to provide a bean turning mechanism capable of operating at high speed for bringing a predetermined area of a bean into position for viewing by a color selecting device; to provide a novel turnover and alining mechanism for bringing coffee beans or peanuts to a sorting point; to provide a new and novel mechanism for bringing flat sided objects, such as coffee beans and peanuts to a sorting point with the most effective area of each exposed to the color selecting device; to provide a mechanism for automatically turning beans having a flat side and a convex side so that the latter side of each is presented at the sorting point; and to provide other improvements as will hereinafter appear.

Figure 1:
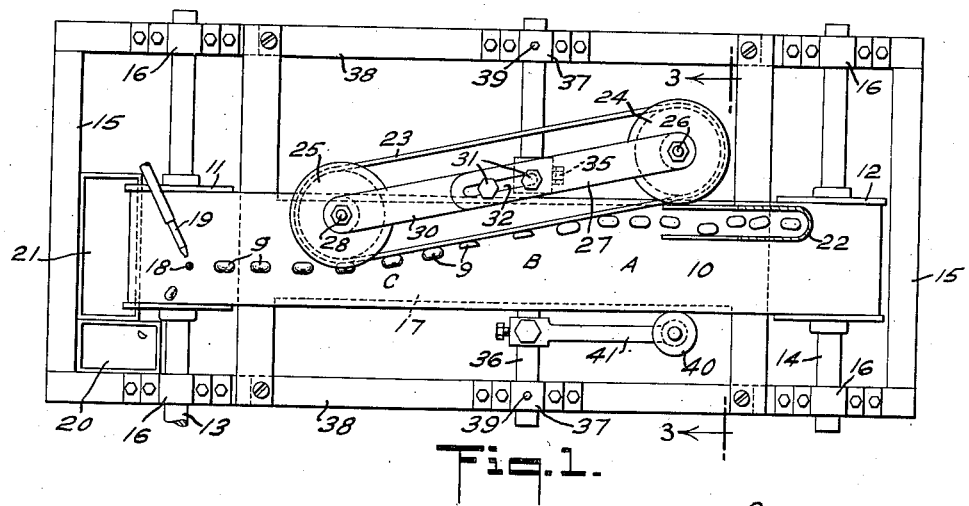
Figure 2:
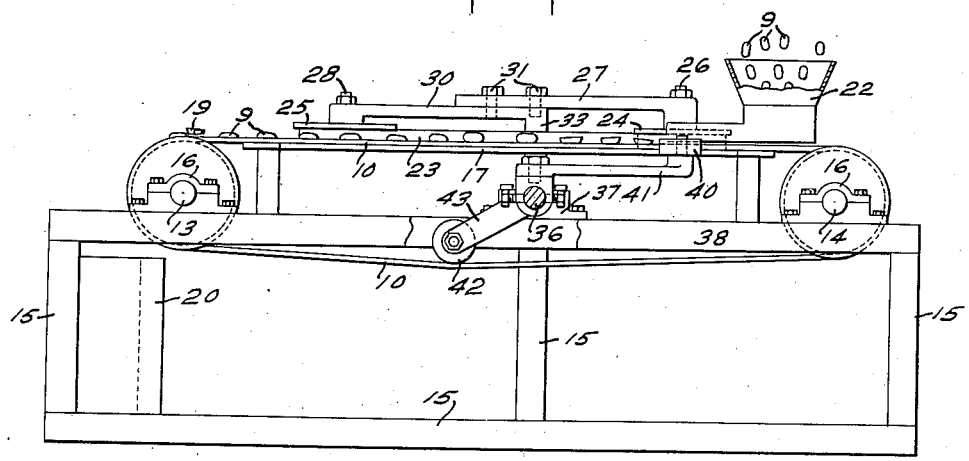
Figures 3, 4, 5, 6:
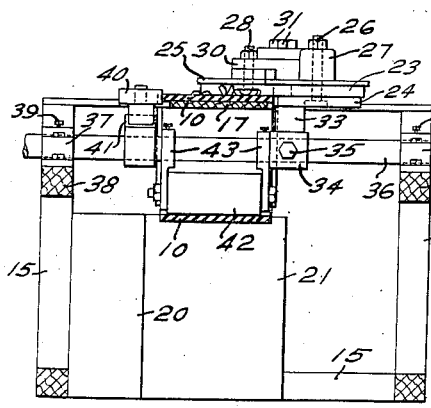

In the accompanying drawings, Fig. 1 represents a plan of one form of bean turning and alining mechanism embodying one form of the present invention; Fig. 2 represents a side elevation of the same partly broken away; Fig. 3 represents a section on line 3 3 of Fig. 1; Fig. 4 represents a fragmentary section showing the position of a bean at position A; Fig. 5 represents a fragmentary section showing the position of a bean at position B; and Fig. 6 represents a fragmentary section showing the position of a bean at position C.

Referring to the drawings, one form of the present invention comprises a horizontally disposed conveyor belt 10, having a rubber or other friction object conveying surface, the same passing around spaced pulleys 11 and 12, the former being secured to a driving shaft 13 and the latter to a driven shaft 14. A supporting frame 15 carries bearings 16 for the respective shafts, as will be understood. The shaft 13 is driven by any suitable source of power. A rigid plate 17 is suitably mounted beneath the bean-carrying portion of the belt 10 to prevent sagging and maintain a substantially uniform level surface for conveying the beans to the sorting point 18. At this point the bean is brought into the path of the light beam for observation by the photo-electric cell as fully explained in the pending application heretofore referred to. The air nozzle 19, by which the good beans are puffed or blown off into the same receptacle 20, and rejected beans into the receptacle 21 as diagrammatically shown, all of which is explained in the aforesaid application and forms no part of the present invention.

Preferably a funnel shaped guide tube 22 is located above the receiving end of the conveyor belt 10, namely above the rear pulley 12 to feed the beans to the belt surface. The beans are allowed to drop into the tube 22 from a suitable supply at such a rate as will prevent packing or massing of the beans in the guide.

As a means for turning the beans as the succession of beans travel with the conveyor belt 10, a flexible band 23, preferably of steel, but essentially one having a frictionless face in contrast to the friction face of the belt 10, is provided, and is mounted to extend angularly from one edge of the belt 10 to a point slightly beyond the medial line of the belt 10. That face of the band 23 which is juxtaposed to the friction face of the belt 10 rides in such close proximity to that belt face as to be in the path of all beans travelling with the belt 10, and in consequence each bean resting on a round side will meet the smooth band and receive a lateral thrust at once frictionally resisted by its contact with the rubber face of the belt 10 to result in a turning movement whereby the bean is turned flat side down, as shown in Figs. 4, 5 and 6.

For mounting the band 23 it is tensioned around a relatively wide rear driven pulley 24 and a relatively narrow front idle pulley 25. The pulley 24 is journalled on a stub shaft 26 projecting laterally from an arm 27, while the pulley 25 is journalled on a stub shaft 28 projecting laterally from an arm 30. The two arms 27 and 30 are arranged in overlapping relation and fastened together by bolts 31 passing through a slot 32 in one of the arms. This construction serves to maintain the band 23 properly stretched while providing means for taking up any slack should such occur. The arm 30 is preferably formed with a downwardly extending leg 33 which is made fast to a yoke 34 by a set screw 35, the yoke 34 being keyed or otherwise attached to a rod 36. As shown, the rod 36 passes transversely through the space formed by the belt 10, and is supported at its ends respectively in brackets 37 carried by the supporting frame 38. Set screws 39 serve to anchor the ends of the rod 36 to the respective brackets 37, thereby providing a means for releasing the rod 36 for turning movement whereby the supporting frame for the band 23 can have its angularity adjusted as desired.

The mounting, just described, is so arranged that the driven pulley 24 bears against one side edge of the belt 10, while the lower edge of the band 23 is above but almost coincident with the plane of the belt 10. An idler pulley 40 is carried by an arm 41 adjustably mounted on the rod 36 in order to bear against the edge of the belt 10 at a point approximately opposite to the driven pulley 25. Thus, the pressure of the idle pulley 40 against the belt 10 holds the latter against the pulley 25 and centralizes the belt on the pulleys. The belt 10 can be tightened and maintained properly taut by means of an idle pulley 42 carried by arms 43 from the rod 36 in order to provide for the required adjustment.

In operation, the beans leaving the guide tube 22 assume a single file relation and are carried forward by the belt 10 in whatever position each has assumed as dropped from the guide tube 22. As each bean 9 rides into contact with the travelling steel band, those beans 9 which are resting on the convex side (as shown at position A) receive a lateral thrust which is immediately translated into a turning movement (as shown at position B). Such turning is due to the frictional resistance of the rubber belt face to lateral movement of the bean in contrast to the free sliding of the non-friction steel band against the bean side and as a result the bean is turned with its flat side down (as shown at position C). Furthermore, the turning action takes place without causing the bean to be displaced from its single file relation. When so turned with its convex side uppermost, it is in the most advantageous position for inspection by the light beam and associated photo-electric cell. As a result, very accurate color comparisons are possible so that all beans of the same selected color graduation are segregated, while beans of off-color are rejected.

It will now be apparent that a novel mechanism for turning and positioning beans for color inspection has been devised wherein all beans are brought to an inspection point with the same side disposed towards the beam of light at such point.

In its broadest sense the invention contemplates the automatic selecting of improperly positioned coffee beans from a plurality of coffee beans randomly arranged relatively in proper and improper positions for color sorting inspection, and manipulating the selected beans into proper position for inspection. While the invention more specifically applies to coffee beans, this term used in the specification and claims is to be interpreted as generic to any objects having a flat side and a convex side. Also, the invention is not limited to the selection of improperly positioned beans traveling in single file as obviously such single file relation is not essential for carrying out the required function.

Having thus described by invention, I claim:

1. A mechanism for feeding objects having a flat side and a convex side exposed for observation, comprising a conveyor belt having a friction surface, means for driving said conveyor to bring objects thereon to an inspection point, means for causing said objects to be delivered to said conveyor, and a band having a substantially frictionless face angularly disposed in the path of the objects on said conveyor, whereby those objects with the flat side uppermost are automatically turned to bring the convex sides uppermost while passing an inspection point.

2. A mechanism for feeding flat sided beans to a sorting point, comprising a conveyor having a friction surface, means for causing beans to be delivered to said surface, a metal band arranged in the path of movement of said beans to impart a lateral thrust to said beans whereby the frictional resistance of said surface causes said beans to be turned flat side down for delivery to said sorting point.

3. A mechanism for feeding coffee beans to an inspection point in predetermined exposed surface condition, comprising a conveyor belt having a bean supporting friction surface, means for causing beans to be delivered to said surface in random arrangement of flat and convex sides seated on said surface, means guiding said beans into single file relation, a vertically disposed driven endless smooth-faced band partially overlying said conveyor surface angularly with respect to the length thereof and intercepting the path of the file of beans to thereby cause those beans resting on a convex side to turn about a friction point of contact and be inverted, whereby all beans leave said band with the convex side uppermost as delivered to said inspection point.

EVERETT H. BICKLEY.

REFERENCES CITED

The following references are of record in the file of this patent:

UNITED STATES PATENTS

| Number | Name | Date |
|---|---|---|
| 301,471 | Aregood | July 8, 1884 |
| 1,874,069 | Weigl | Aug. 30, 1932 |
| 1,959,238 | Horsfield | May 15, 1934 |
| 1,988,381 | Gordon et al. | Jan. 15, 1935 |
| 2,063,485 | Carris | Dec. 8, 1936 |